United States Patent
Bigelow

(10) Patent No.: US 9,033,280 B2
(45) Date of Patent: May 19, 2015

(54) CARRIER FOR SPACE CRAFT

(75) Inventor: Robert T. Bigelow, Las Vegas, NV (US)

(73) Assignee: Bigelow Aerospace, North Las Vegas, NV (US)

( * ) Notice: Subject to any disclaimer, the term of this patent is extended or adjusted under 35 U.S.C. 154(b) by 430 days.

(21) Appl. No.: 13/134,732

(22) Filed: Jun. 15, 2011

(65) Prior Publication Data

US 2012/0318927 A1    Dec. 20, 2012

(51) Int. Cl.
*B64G 1/64* (2006.01)
*B64G 4/00* (2006.01)
*B64G 1/10* (2006.01)
*B64G 1/22* (2006.01)

(52) U.S. Cl.
CPC . *B64G 4/00* (2013.01); *B64G 1/646* (2013.01); *B64G 1/1078* (2013.01); *B64G 2001/224* (2013.01); *B64G 2004/005* (2013.01)

(58) Field of Classification Search
CPC ........... B64G 1/646; B64G 4/00; B64G 1/222
USPC ....................... 244/132.4–172.6, 171.1, 158.1
See application file for complete search history.

(56) References Cited

U.S. PATENT DOCUMENTS

| | | | | |
|---|---|---|---|---|
| 4,860,975 A * | 8/1989 | Schliesing et al. | .......... | 244/172.4 |
| 4,903,919 A * | 2/1990 | Johnson et al. | ............ | 244/172.4 |
| 5,005,786 A * | 4/1991 | Okamoto et al. | .......... | 244/172.4 |
| 5,580,013 A * | 12/1996 | Velke | ......................... | 244/159.5 |
| 5,967,464 A * | 10/1999 | Miyoshi | ..................... | 244/172.5 |
| 6,547,189 B1 * | 4/2003 | Raboin et al. | .............. | 244/158.3 |
| 7,793,888 B2 * | 9/2010 | Padan | ........................ | 244/137.4 |
| 2006/0163434 A1 * | 7/2006 | Patel et al. | ................. | 244/158.3 |
| 2006/0278765 A1 * | 12/2006 | Strack et al. | ............... | 244/172.4 |
| 2010/0038491 A1 * | 2/2010 | Cepollina et al. | .......... | 244/172.5 |

* cited by examiner

*Primary Examiner* — Rob Swiatek
*Assistant Examiner* — Marc Burgess
(74) *Attorney, Agent, or Firm* — Franklin E. Gibbs

(57) ABSTRACT

A spacecraft carrier is disclosed. The carrier has a large internal volume for housing at least one spacecraft. The carrier can be used as a repair and maintenance facility in space for spacecraft. Manned and unmanned devices can be stored, repaired and resupplied. The carrier can also transport a number of spacecraft to other locations allowing for an efficient coordinated movement of many spacecraft.

2 Claims, 4 Drawing Sheets

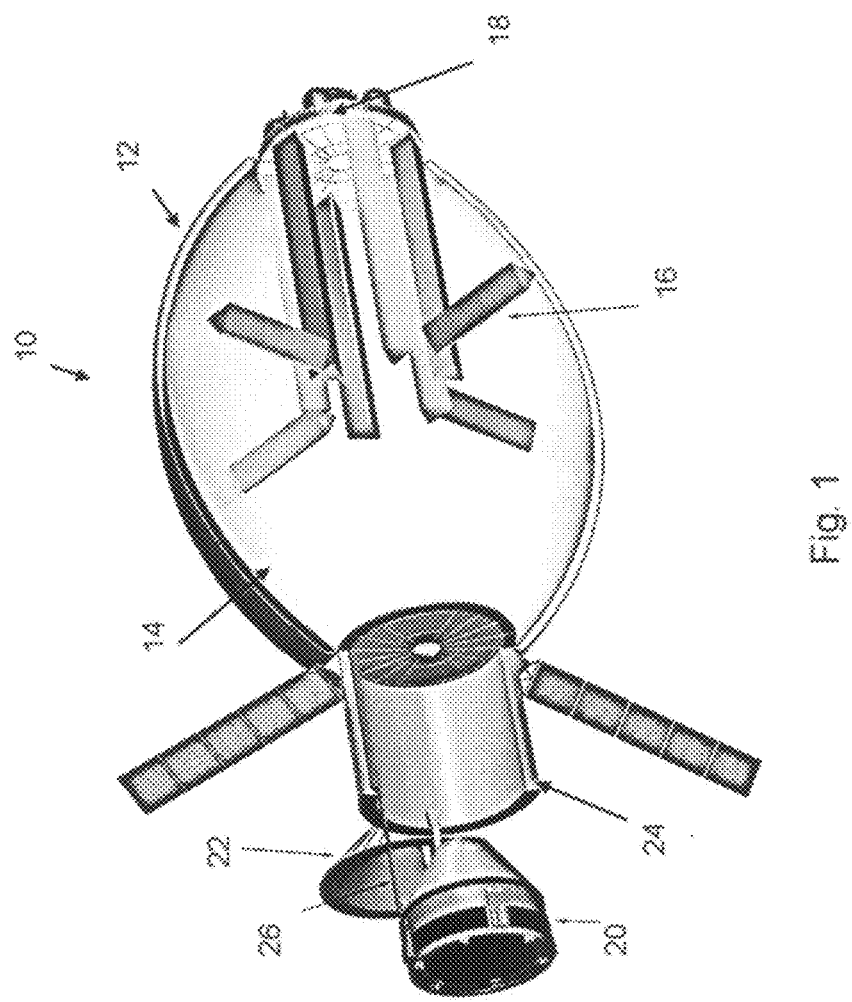

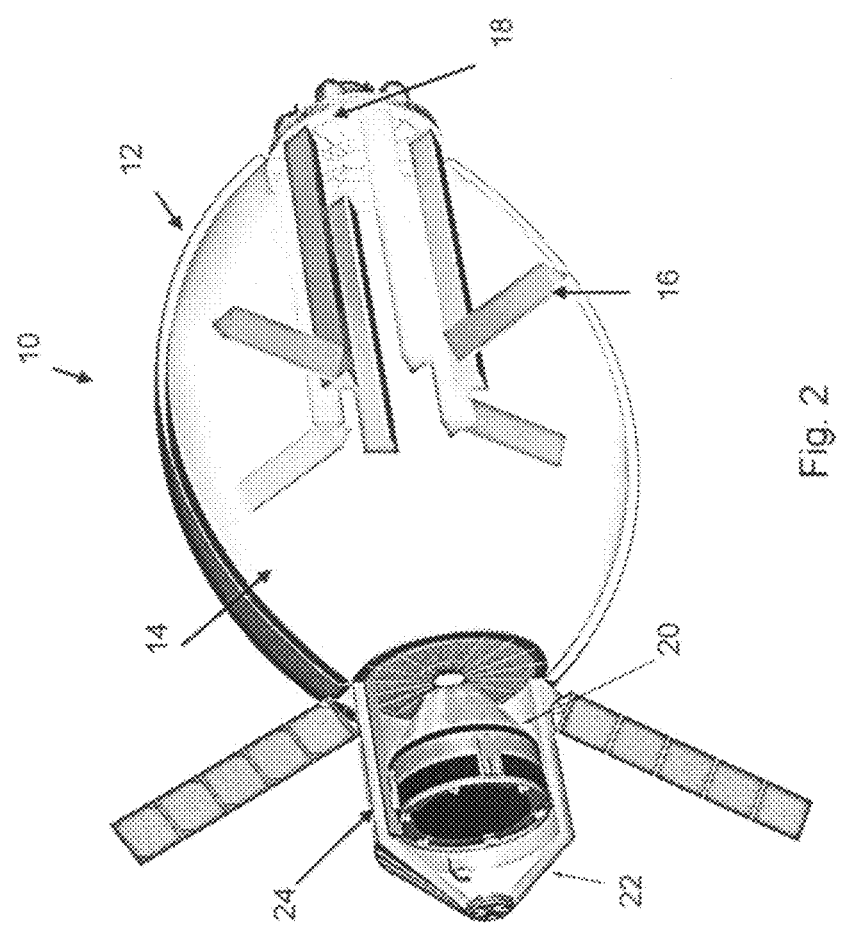

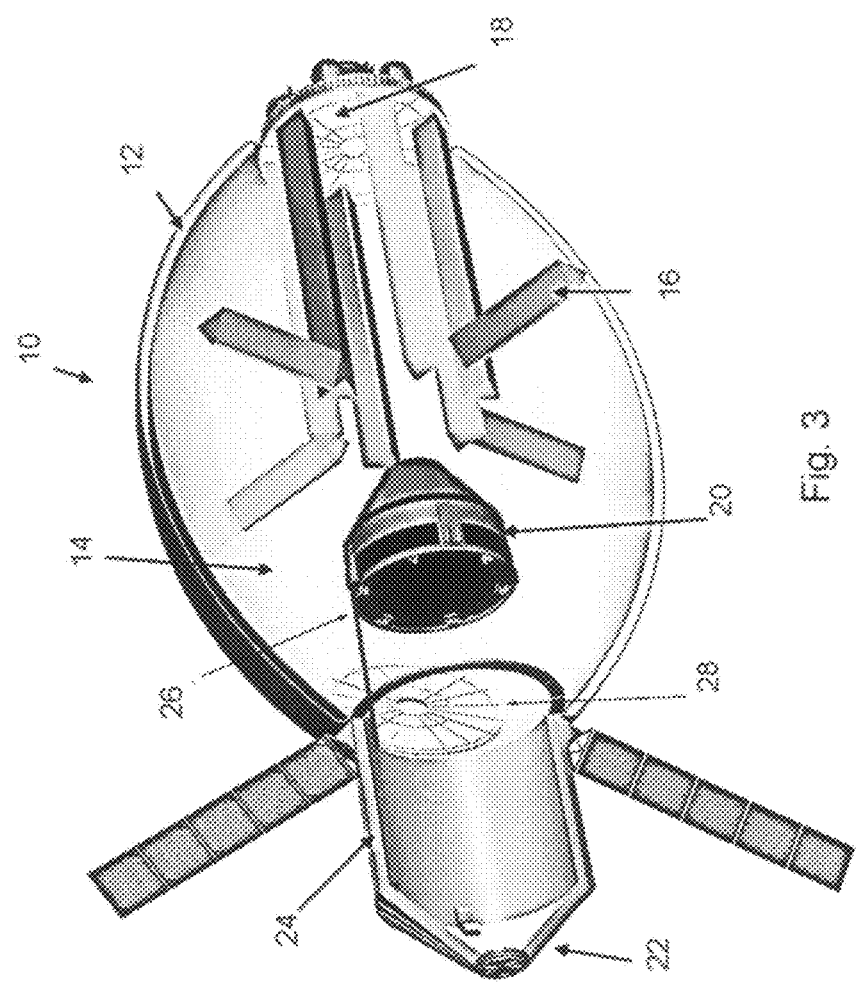

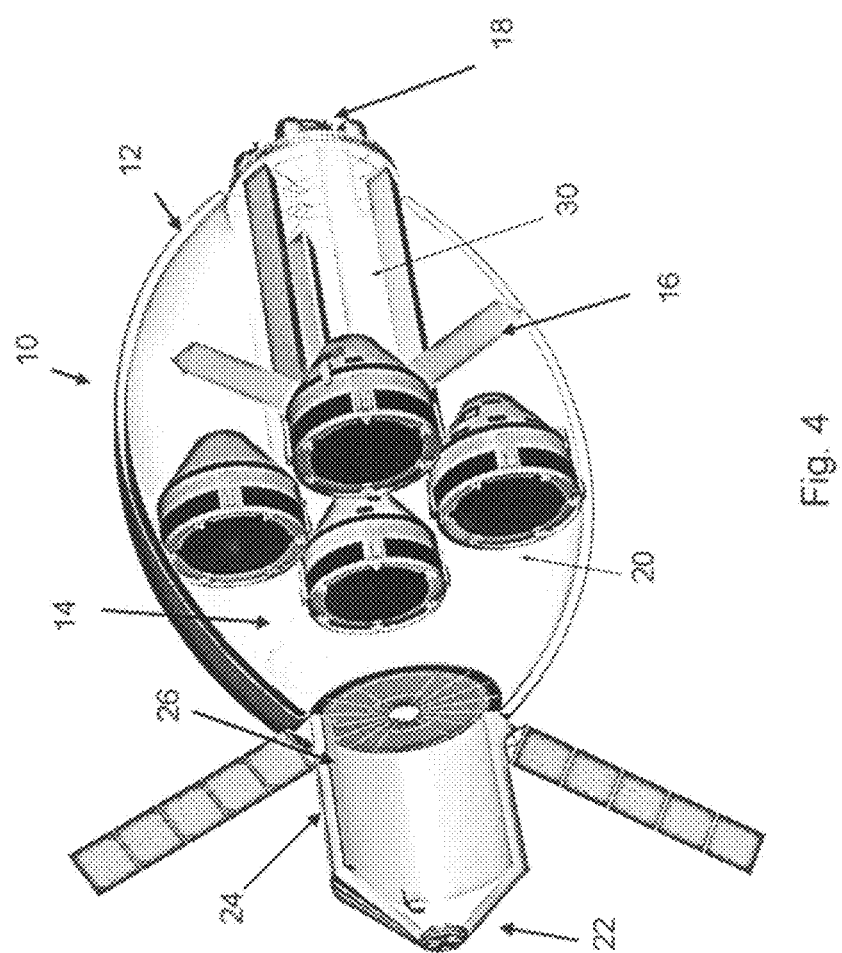

CARRIER FOR SPACE CRAFT

FIELD OF THE INVENTION

This invention generally relates to space vehicles that can operate as a carrier for other spacecraft.

BACKGROUND OF THE INVENTION

Space exploration is a rapidly developing field. The types of spacecrafts cover a vast range including manned hard shelled space stations, space shuttles, and satellites—to name a few. These crafts usually provide invaluable information and services. However, the fact that these devices are operating in the generally inhospitable environment of space incorporates a unique set or issues. One such issue is a lack of the ability to repair the vessels in space.

While space stations such as the International Space Station can facilitate a certain level of repair for itself, this is the exception rather than the rule and even so, the level of repair is very limited. In most cases repair is only through very expensive means or not available at all.

Traditional hard shelled stations present internal space limitations due to factors including the high cost of placing such stations into orbit or beyond. Attempting to assemble larger hard shelled craft in space is an expensive undertaking. This restriction basically prevents any repairs to other space craft or satellites within the habitable volume of the station. While the space shuttle can be called into service to repair satellites, there is nothing at present that can take a satellite into a large habitable environment. The space shuttle requires technicians or astronauts to bulking space suits for repairs. While the suits prove very useful, dexterity and vision are hampered by the suits.

Along with this restriction, the astronauts and technicians have less radiation shielding than if they were operating in a heavily shielded space station. The combination of space suits and minimal radiation shielding creates a condition where it is not safe for humans to repair space devices for an extended period of time.

The general characteristics of inflatable human habitats have been identified in While U.S. Pat. No. 6,231,010 to Schneider, et al and U.S. Pat. No. 6,547,189 to Raboin, et al. Further, U.S. Pat. No. 6,439,508 to Taylor identifies inflatable structures connected together in space. However these structures are not identified as being capable of serving as space craft that could operate as repair centers or carriers of other space craft. There is simply nothing to meet the demand of repairing a spacecraft within an expandable habitable environment.

One advantage to the inflatable craft is that the volume of the craft increases on deployment to many times the volume of hard shelled unit of similar launch characteristics and weight. Also, the radiation shielding of an inflatable craft is typically much greater than a hard shelled craft.

What is needed is an inflatable space craft that provides a large habitable environment so technicians can repair other space craft. The inflatable space craft can also serve the function of transporting one or more spacecraft to other locations.

SUMMARY OF THE INVENTION

A carrier for spacecraft comprises an expandable module having an internal volume sufficient to house multiple spacecraft. There is an end cap disposed at one end of the module and a chamber comprising an external hatch and an internal hatch disposed on the module at an opposite end to the end cap. A robotic arm attached to the chamber and adapted to extend beyond the external hatch and to connect to a spacecraft and the robotic arm is adapted to extend beyond the internal hatch. Within the carrier are a number of trusses with each truss being attached to an end cap. In one embodiment of operation, the external hatch opens to receive a spacecraft that is guided into the chamber by the robotic arm. The external hatch then closes and the internal hatch is opened with the robotic arm guiding the spacecraft to a truss wherein the spacecraft is secured to the truss.

BRIEF DESCRIPTION OF THE DRAWINGS

The invention is generally shown by way of reference to the accompanying drawings in which:

FIG. 1 is a cutaway side view of an expandable habitable module carrier for spacecraft poised to receive a spacecraft;

FIG. 2 is a cutaway side view of an expandable habitable module carrier for spacecraft identifying a spacecraft entering the airlock;

FIG. 3 is a cutaway side view of an expandable habitable module carrier for spacecraft identifying a spacecraft within the airlock; and FIG. 4 is a cutaway side view of an expandable habitable module carrier for spacecraft housing a number of spacecraft.

DETAILED DESCRIPTION OF THE INVENTION

FIG. 1 is a cutaway side view of an expandable habitable module spacecraft carrier 10. The carrier 10 has a flexible shell 12 that is comprised of a number of layers including a radiation shield. Within the carrier 10 are a habitable environment 14 and several trusses 16. In this embodiment, the trusses 16 are configured in a star type pattern, but this pattern is not intended to limit the geometries of the trusses 16. In this embodiment, the trusses are attached to an end cap 18. The trusses 14 are designed to accommodate a spacecraft 20. The spacecraft 20 could be manned capsules or unmanned craft such as satellites or other space devices.

The trusses 16 include attaching mechanisms to secure the spacecraft in position. This can extend to, but is not limited to, docking mechanism and attaching structures. The trusses 16 can also contain conduits for providing power to the spacecraft. Also available would be conduits that could provide air, water and other compounds while removing unwanted materials such as carbon dioxide.

In FIG. 1 an external hatch 22 is attached to an intermediary chamber 24 such as an airlock. Turning to FIG. 2, a robotic arm 26 attaches to the spacecraft 20 and draws the spacecraft 20 into the chamber 24. The hatch 22 is then closed.

Once closed, the chamber 24 can be filled with air to equalize the pressure between the chamber 24 and the habitable environment 14.

FIG. 3 identifies an internal hatch 28 that is opened to allow the spacecraft to move from the airlock 24 to the habitable environment 14. The robotic arm 26 is attached to the spacecraft 20 and provides the force necessary to transition the spacecraft from the chamber 24 toward the trusses 16.

Turning to FIG. 4, a number of spacecraft 20 are within the carrier and attached to the trusses 16. Structural elements 30 can be used to support equipment, tools, spare parts, storage, or supplies.

The operation of the carrier 10 can be performed in reverse with the spacecraft being guided outside of the carrier by use of the robotic arm.

Once a spacecraft is housed within the carrier, technicians and other personnel could repair, upgrade, or refit the spacecraft. The large environment of the carrier 10 provides the advantage of a greater working area.

The carrier 10 can also be used to transport one or more spacecraft to other locations. In this fashion, movement of multiple craft can be accomplished at the same time in an efficient manner. In one embodiment, the carrier can have a propulsion bus attached. In another embodiment, the carrier can be attached to another craft that provides sufficient propulsion to move the carrier.

The embodiment in the figures identifies a spacecraft capsule, but nothing restricts the invention from application to satellites and other types of space craft.

While embodiments have been described in detail, it should be appreciated that various modifications and/or variations may be made without departing from the scope or spirit of the invention. In this regard it is important to note that practicing the invention is not limited to the applications described herein. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein. Thus, it is intended that the invention cover all such embodiments and variations. Nothing in this disclosure is intended to limit the scope of the invention in any way.

What is claimed is:

1. A carrier for spacecraft comprising:
    an expandable module having an expandable shell and an internal volume sufficient to house multiple spacecraft;
    an end cap disposed at one end of the module;
    a chamber comprising an external hatch and an internal hatch, the internal hatch being disposed on the module at an opposite end to the end cap;
    a robotic arm attached to the inside of the chamber and adapted to extend beyond the external hatch and to connect to a spacecraft and the robotic arm being adapted to extend beyond the internal hatch;
    a plurality of trusses inside the internal volume of the expandable module and each truss being attached to the end cap;
    wherein with the external hatch open and the internal hatch closed, the robotic arm is adapted to transition the spacecraft from outside the chamber into the chamber, and with the external hatch closed and the internal hatch open, the robotic arm is adapted to transition the spacecraft from the chamber into the internal volume of the expandable module.

2. The carrier of claim 1 further comprising tools for repairing a spacecraft.

* * * * *